May 1, 1928.
W. S. SMITH ET AL
PHOTO ELECTRIC CELL
Filed Dec. 5, 1927
1,668,383
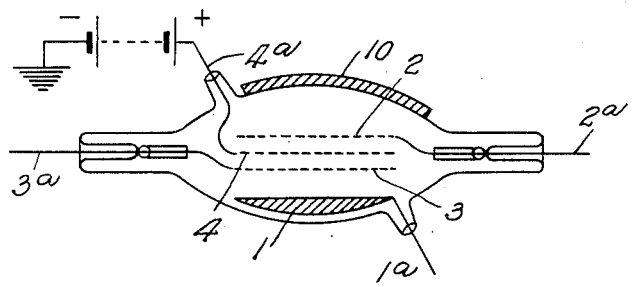
Inventors
Willoughby S. Smith
Norman W. McLachlan
By their attorneys
Baldwin & Wight Patented May 1, 1928.

1,668,383

UNITED STATES PATENT OFFICE.

WILLOUGHBY STATHAM SMITH, OF BENCHAMS, NEWTON POPPLEFORD, AND NORMAN WILLIAM McLACHLAN, OF LONDON, ENGLAND.

PHOTO-ELECTRIC CELL.

Application filed December 5, 1927, Serial No. 237,771, and in Great Britain August 8, 1926.

This invention relates to photo-electric cells and is applicable alike to photo-electric cells of the so-called gas filled or to the high vacuum type. The invention has for object the provision of a photo-electric cell whose effective output can be readily controlled and in which the effects of interelectrode capacity are minimized or eliminated. In photo-electric cells of the kind in which one or more control electrodes, for example of grid form are located within the cell between the cathode and the anode thereof there is normally a sluggishness in action due to the inherent capacity.

The inter-electrode capacity, more particularly that between the grid-like electrode or electrodes and the anode, may be undesirable. For example, in a photo-electric cell having one grid-like electrode, serving as an input electrode, capacity between this said grid-like electrode and the anode or output electrode may be very undesirable for obvious reasons.

In carrying out the present invention a photo-electric cell having a control electrode between anode and cathode is provided with one or more additional electrodes adapted to act as an electrostatic screen or screens, and so formed as substantially not to impede electron flow.

In one arrangement embodying the present invention, a photo-electric cell, provided with a control grid and an electrostatic screen is adapted to be operated by a moving beam of light moving relatively thereto. This is effected by inserting in the path of the said beam a graded light filter or screen so that the intensity of light falling upon the cell varies as the beam and the screen move relatively to one another.

If desired the graded light filter or screen 10 may be formed as part of or attached to the window of the photo-electric cell. It will be seen that as the beam of light moves across the window of the cell, the degree of activation of the photo-electric material is varied.

The invention is illustrated in the accompanying drawing which shows a photo-electric cell having a control grid and one screening grid between the input and output circuits of the cell.

Referring to the figure, 1 is an electrode having a coating of photo-electrically sensitive material, 2 an anode formed as in the known manner, of mesh work, 3 a control grid situated therebetween, and 4 a screening electrode formed as a mesh or wire grid, or as a series of plates with slots, and interposed between the control grid 3 and the anode 2.

The electrode 4 is connected by way of its connection 4ª to a point of relatively static potential (e. g. earth, either directly or through a battery as shown) so as to act as an electrostatic screen. The mesh and general formation of the screening grid should be such as to permit substantially unimpeded electron flow to the anode.

The leads 1ª 3ª to the input electrodes should be well separated from the lead 2ª to the output electrode, so as to avoid undesired capacity therebetween.

What we claim is:—

A photo-electric cell comprising an envelope containing an electron emitting light sensitive cathode, an anode, a control electrode situated between said anode and cathode, an electrostatic screening grid between said control grid and said anode, external connection means for all of said electrodes, the connection means for the anode being brought outside the envelope at a point remote from that at which the connection for the cathode is brought out, and a graded light filter attached to said envelope.

In testimony that we claim the foregoing as our invention, we have signed our names this twenty second day of November, 1927.

WILLOUGHBY STATHAM SMITH.
NORMAN WILLIAM McLACHLAN.